US007447556B2

(12) United States Patent
McBagonluri et al.

(10) Patent No.: US 7,447,556 B2
(45) Date of Patent: Nov. 4, 2008

(54) SYSTEM COMPRISING AN AUTOMATED TOOL AND APPERTAINING METHOD FOR HEARING AID DESIGN

(75) Inventors: Fred McBagonluri, Plainsboro, NJ (US); Tong Fang, Morganville, NJ (US); Peter Nikles, Erlangen (DE); Joerg Bindner, Weisendorf (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 371 days.

(21) Appl. No.: 11/347,151

(22) Filed: Feb. 3, 2006

(65) Prior Publication Data

US 2007/0189564 A1 Aug. 16, 2007

(51) Int. Cl.
*G06F 19/00* (2006.01)

(52) U.S. Cl. .......................... 700/98; 700/118; 381/312

(58) Field of Classification Search .................. 700/98, 700/118; 381/68, 312, 322, 328; 623/909, 623/912; 264/222; 181/130, 135; 425/2
See application file for complete search history.

(56) References Cited

U.S. PATENT DOCUMENTS

| | | | | |
|---|---|---|---|---|
| 5,487,012 | A * | 1/1996 | Topholm et al. | 700/163 |
| 5,804,109 | A * | 9/1998 | Perkins | 264/40.1 |
| 6,473,512 | B1 * | 10/2002 | Juneau et al. | 381/328 |
| 7,050,876 | B1 * | 5/2006 | Fu et al. | 700/118 |
| 7,162,323 | B2 * | 1/2007 | Brumback et al. | 700/118 |
| 2002/0196954 | A1 | 12/2002 | Marxen et al. | |
| 2004/0107080 | A1 * | 6/2004 | Deichmann et al. | 703/6 |
| 2004/0165741 | A1 * | 8/2004 | Fang et al. | 381/322 |

FOREIGN PATENT DOCUMENTS

| | | |
|---|---|---|
| EP | 1345470 | 9/2003 |

* cited by examiner

*Primary Examiner*—Alexander J Kosowski
(74) *Attorney, Agent, or Firm*—Schiff Hardin LLP

(57) ABSTRACT

A system and appertaining method are provided for electronically detailing an impression of an ear canal of a patient. A digitized geometric model of the impression is created, and a software tool is utilized to determine a bony part or canal direction, as well as first and second bends of the impression. An aperture of the impression is determined, and a cutting plane through the aperture is calculated such that the normal vector through the aperture plane aligns with a normal vector of the second bend plane. On establishing this congruence, modeling parameters optimized for modeling wireless based hearing instruments are evoked to optimized and automate design. This calculation can then be utilized for either manual or automated shaping and cutting operations.

17 Claims, 8 Drawing Sheets

SYSTEM COMPRISING AN AUTOMATED TOOL AND APPERTAINING METHOD FOR HEARING AID DESIGN

BACKGROUND

The present invention is directed towards an automated tool and appertaining method to assist in designing and manufacturing the 3D shape of an in-the-ear hearing aid shell.

The development of 3D modeling technologies for hearing aid design and manufacturing has created a new impetus in hearing instrument technology. In these developments within the hearing aid industry, emphasis has been directed at adapting manually intensive processes into software in order to reduce inherently laborious and uncomfortably repetitive manual processes. To date, there has been little adaptation of analytical and decision-making technologies to facilitate robust automation of hearing instrument manufacturing. The analytical complexity resulting from significant divergence in ear canal shape distribution makes the accurate replication of hearing instrument modeling a daunting task.

In order to accommodate the variance in ear canal shape, physical casts of the ear and ear canal ("impressions") are created in order to facilitate the design for completely-in-the-canal (CIC) hearing aids, which are a type of in-the-ear (ITE) devices (this refers to a class of hearing aid instruments, usually the full concha type) that, as the name suggests fit completely or nearly completely within the ear canal.

For the sake of clarity, the following definitions and explanations are provided. An "impression" refers to mold material that is initially inserted and then extracted from a patient's ear. This represents a physical replicate of the patient ear canal characteristics. The term "impression" can also refer to the point set data obtained from a 3D scanner of a mold.

A "canal" is a continuous section of the impression extending from the aperture to the canal tip, where the "aperture" is the largest contour located at the entrance to or outermost portion of the canal, and the "canal tip" is the highest or innermost point on the canal. The "second bend" is one of two curvatures points that occur between the aperture and the canal tip. It may or may not be distinct for some ear canals, and is a function of ear canal curvature. The "bony part" refers to the end of the canal tip, which essentially extends towards the inner part of the ear where bone is present.

Currently, the hearing aid shell detailing is a manual process. Detailing is a term that refers to the process of reducing an impression mold either elctronically or manually to a prescribed device size. This manual state of the art technique requires the technician to make the following decisions: a) manually determine the direction of the bony part of the ear to ensure optimal performance of a wireless system (i.e., optimizing a binaural pair of hearing devices for wireless communication between them). This involves using a graduated angular measurement device, which is a device that has a range of angles corresponding to an optimal value and a range of allowable angles; b) determine the location on the impression to initiate a final cut for the shell; and c) determine the criterion to use to determine whether a fixed or floating microphone assembly configuration shall be used. A complex manual detailing procedure with intermittent manual angular measurements has been used to facilitate this process, however, there is currently no present mechanism to achieve automated feature-based and rule-based detailing of the hearing aid shell.

The manual steps of detailing the shell and making correct measurements and cuts are proned to error and are time consuming. What is needed in the industry is a procedure that permits an automated feature-based and rule-based 3D detailing of a hearing aid device for an ear canal having a particular shape.

SUMMARY

According to various embodiments of the present invention, a new detailing and modeling concept is provided in which advanced feature recognition protocols are employed to segment and to extract metrologically significant parameters to augment design protocols for an ITE hearing aid.

In this implementation, advanced algorithms are applied to segment ear mold impression features. Furthermore, characteristic canal directional vectors of the bony part of the ear impression are extracted from the segmentation protocols. The detailing and modeling protocols of ITE shells consolidate these analytical parameters and software implemented definitive protocols to achieve dynamic design of hearing aid instruments, resulting in a significant reduction or elimination of manual operations.

Advantageously, the software component according to various embodiments helps to ensure detailing consistency and throughput for hearing aid shells, and eliminates manually determining the direction of the bony part using the physical cast/impression and ensures optimal performance of wireless communication between binaural hearing aid pair. Using these techniques, an impression can be detailed in as little as three minutes.

DESCRIPTION OF THE DRAWINGS

The invention is explained in terms of various preferred embodiments, which are explained in more detail below and illustrated by the following drawings.

DETAILED DESCRIPTION OF THE PREFERRED EMBOIDIMENTS

Figure 1A:
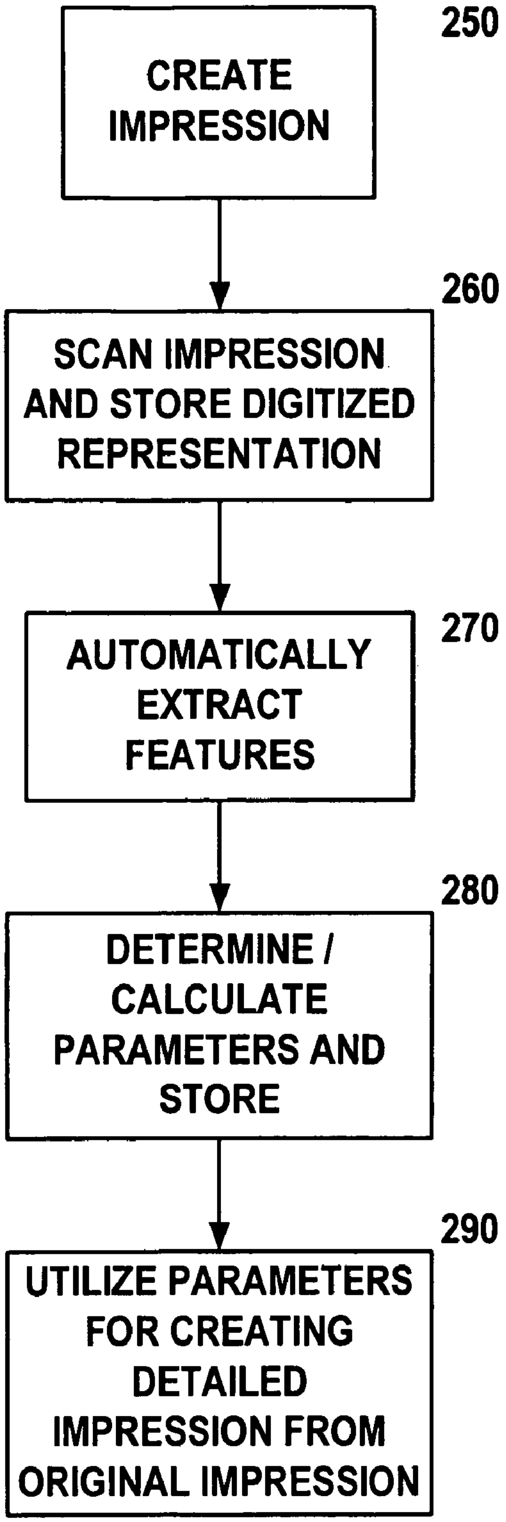
FIG. 1A is an overall flowchart of an embodiment of the inventive method.
Figure 4:
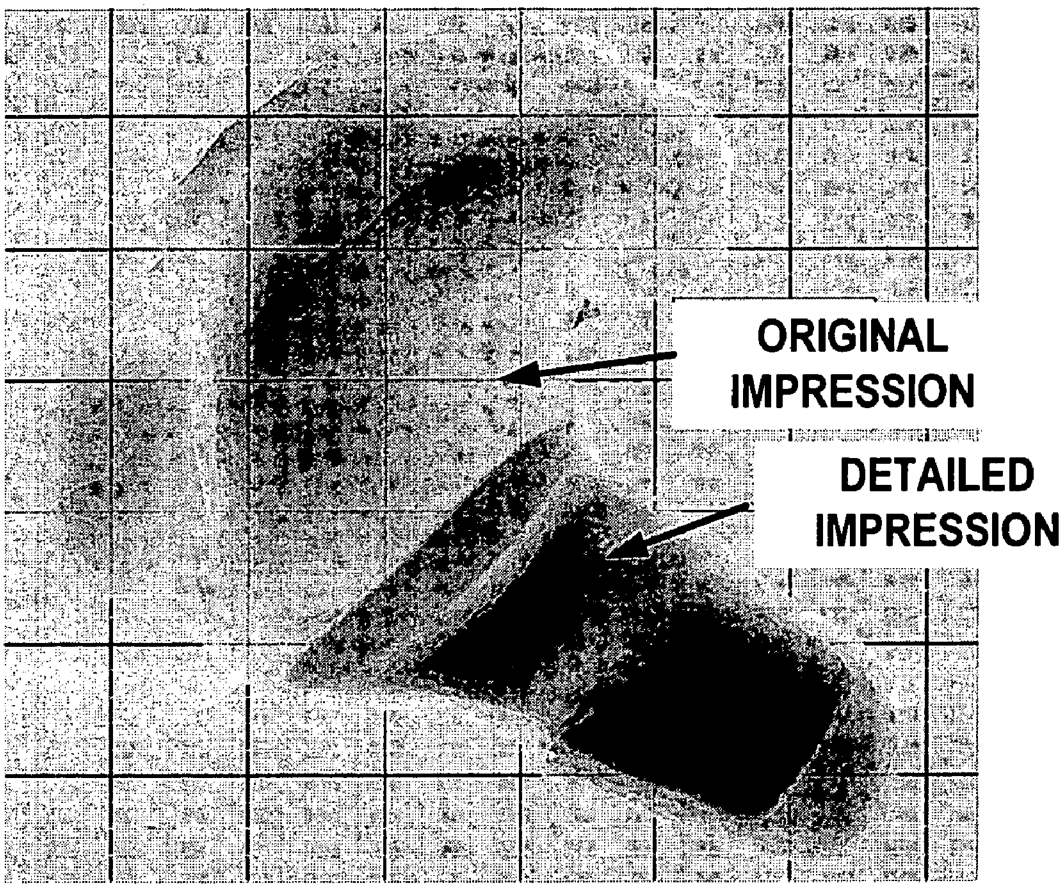
FIG. 4 is a three-dimensional model illustrating an original impression and a detailed impression superimposed.

FIG. 1A is a high-level flowchart that illustrates an embodiment of the invention. A physical cast of the ear and ear canal is created 250 producing an impression that corresponds to the ear and ear canal. The impression is then scanned 260 and a digitized representation of the impression is stored. An embodiment of the inventive system automatically extracts relevant features 270 from the stored digitized representation of the ear and ear canal impression, and then various appertaining parameters associated with the impression features are determined and stored 280. These parameters are then utilized in cutting and shaping procedures in creating a detailed impression from the original impression 290. FIG. 4 provides an illustration of a 3D model of an original impression superimposed on a 3D model of a final detailed impression.

Figure 1B:
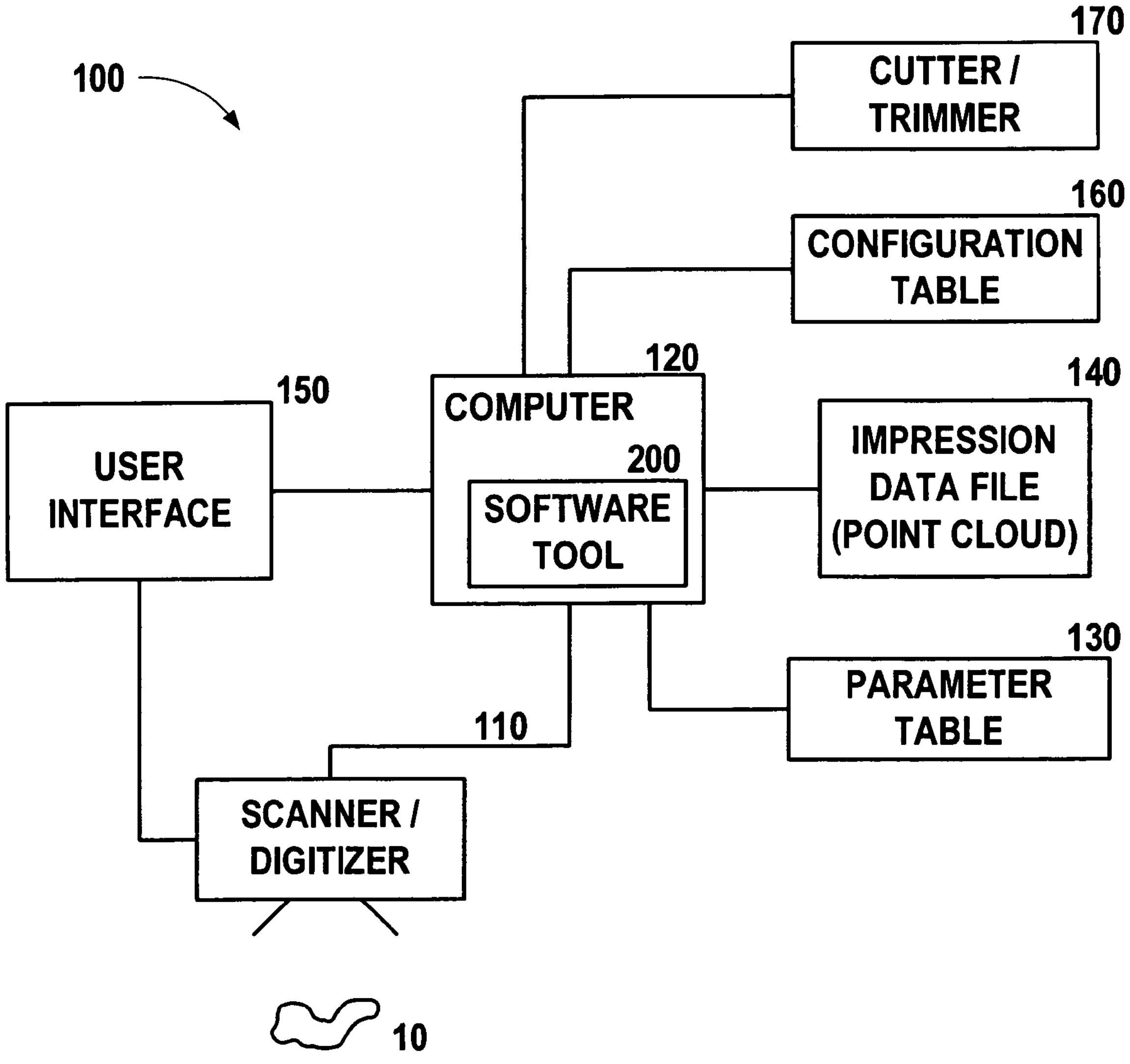
FIG. 1B is a high level block diagram of the inventive system.

FIG. 1B illustrates the primary components utilized in an exemplary system 100 that implements the various embodiments of the invention. After an impression of the ear is taken, the impression is scanned and digitized with a scanner 110. The information associated with the impression is stored in an impression data file 140 of the system 100. When the shell is to be produced, the impression data is loaded on the computer system 120 from the impression database file 140. The canal is trimmed and tapered based on this data either by a user or by an automated trimming and tapering system. A user may initiate the automation software tool 200 using the user interface 150 in a manner such as by clicking a button on a display with a mouse.

The software tool 200 can be run on any standard computer 120 having a processor, input/output, memory, and user interface that utilizes a standard operating system, such as Windows XP, Unix, or any other OS. The computer 120 interfaces with a scanner/digitizer 110 that is used to obtain geometric information from the impression 10 and permits the software tool 200 to interface with an impression data file 140 which stores the geometry of the impression 10. Any current state-of-the-art digitizer with the ability to generate 3D point set/clouds may be used. This could include, e.g., direct in-the ear scanners, 3D Shape Scanners, Minolta, Cyberware, and 3 shape scanners. This data may be represented as a point cloud, which is defined as the collection of points in 3D space resulting from scanning an object, and comprises a set of 3D points that describe the outlines or surface features of an object.

The computer 120 is also connected to a parameter table 130 which holds the various associated parameters. The computer has a user interface 150 that may be any standard user interface for entering data and displaying information to the user. The user interface 150 may also be connected to the scanner 110 or the scanner may utilize its own user interface 150.

Figure 2A:
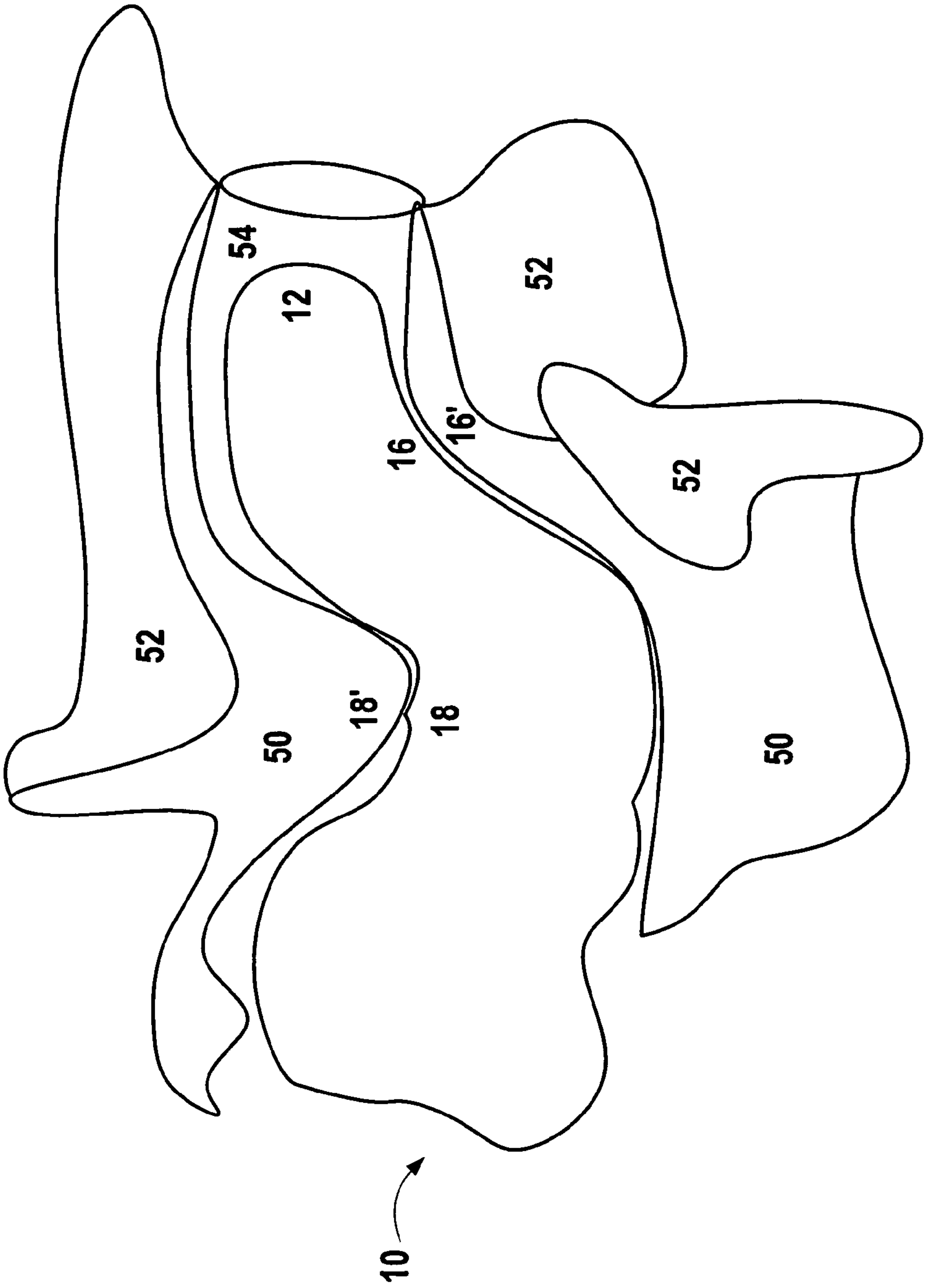
FIG. 2A is a cross-sectional diagram of a CIC hearing aid implanted in the ear.

FIG. 2A illustrates a cross section of an ear having an impression 10 inserted into the ear canal 54. The ear canal 54 is formed by cartilaginous sections 50, that tend to be relatively soft, surrounded, towards the inner ear region, by bony sections 52.

A molding material is inserted into the ear canal 54, and once the impression 10 has formed and solidified, the impression 10 is removed from the ear. The impression 10 has a canal tip 12 that corresponds to an innermost portion of the ear canal 54, a second bend 16 that corresponds to a second bend 16' region of the canal, and an aperture region 18 corresponding to the aperture opening 18' of the ear canal. These are the features that the software tool 200 according to an embodiment of the invention utilizes in making the detailing decisions.

Figure 2B:
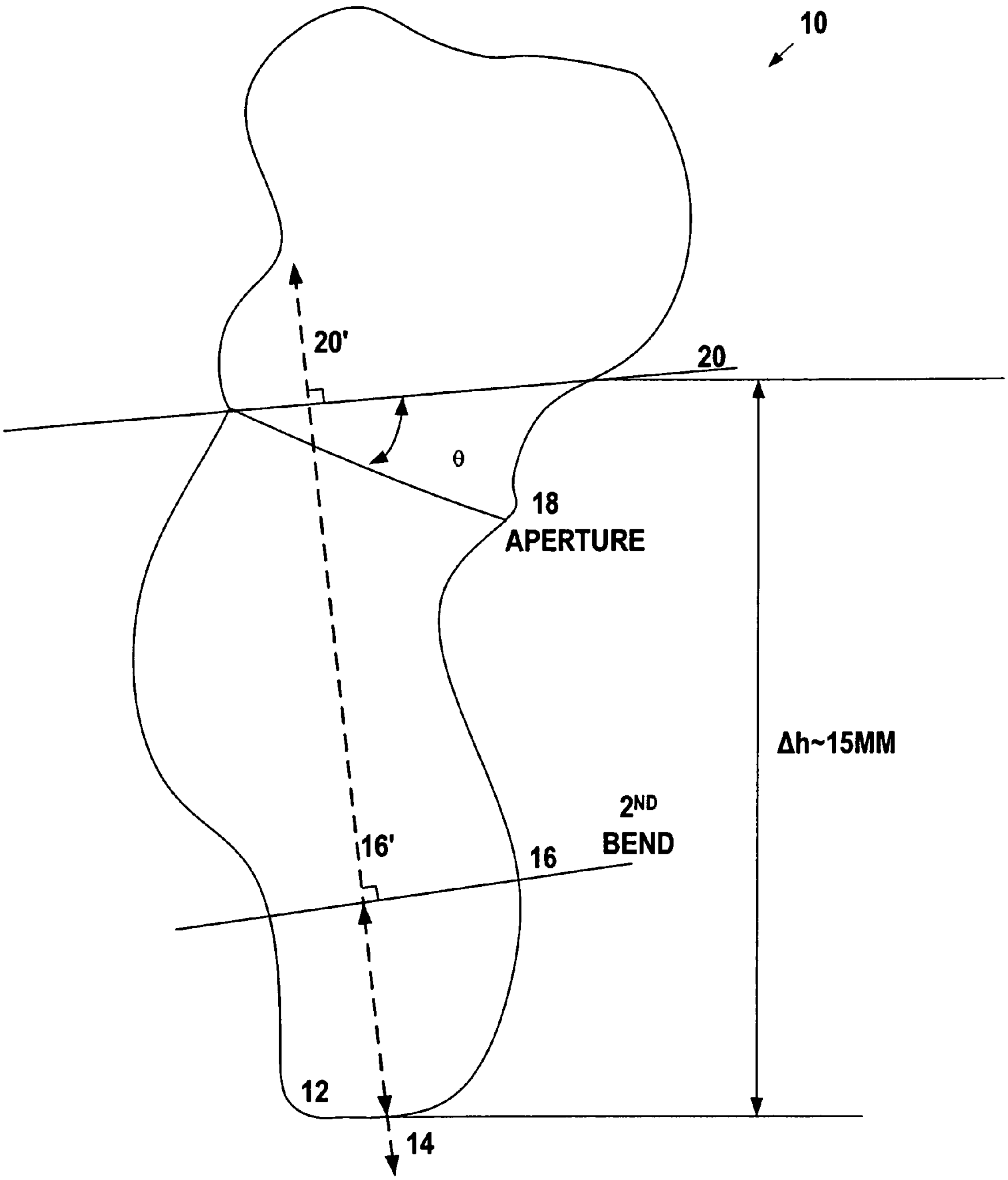
FIG. 2B is a pictorial diagram of a CIC hearing aid illustrating the detailing protocol features.
Figure 3A:
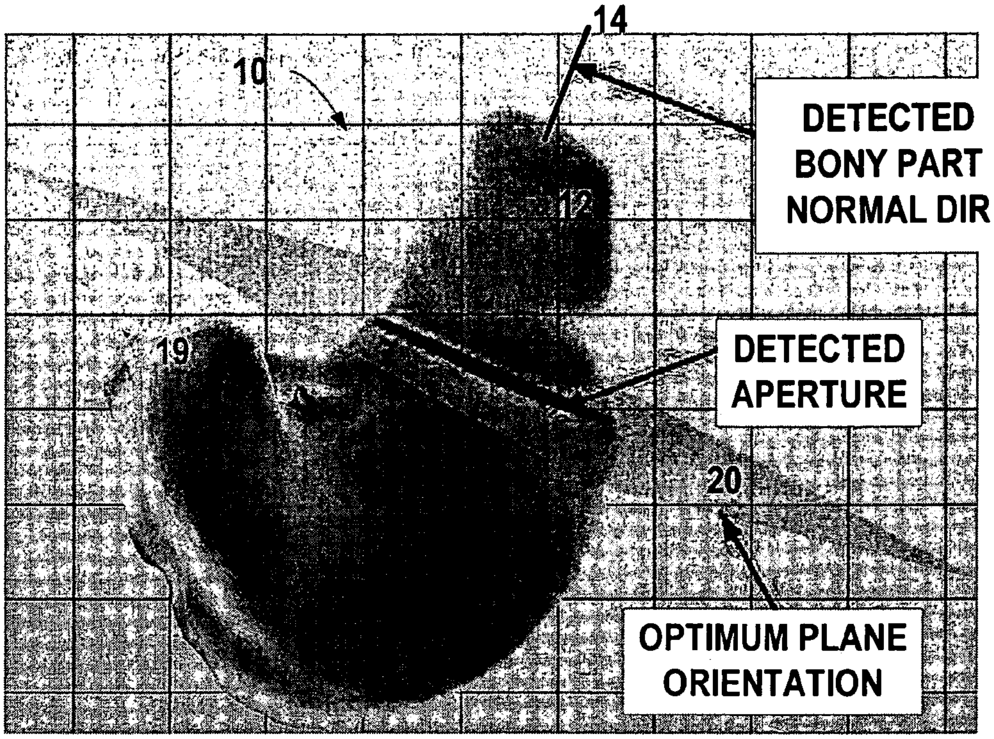
FIGS. 3A, B are three-dimensional models illustrating the automatic detection of canal and aperture orientation and contours.

Referring to FIG. 2B, the software tool 200 automatically detects the aperture 18 of each ear mold impression 10. The aperture 18 is determined by selecting the maximum change of perimeter of adjacent contours, which are generated by parallel scanning along the center line of the shell. The software tool 200 associates an aperture 18 plane at this location and then, by a process described in more detail below, ultimately arrives at an angle for a determined a cutting plane 20 at this location. The final orientation of the plane 20 is geometrically parallel to the normal vector (or centerline 14) of the bony part (canal direction) of the ear (see FIG. 3A for a 3D representation).

In this process, the software tool 200 automatically detects and extracts the equation of the minor axis of the canal tip 12 of the impression 10 and outputs these parameters to a parameter table/database 130 for further analytical implementation. By using, e.g., the well-known tool of Principal Component Analysis (PCA) methods, the major axis/minor axis can be calculated from the points of canal tip contour, which is generated by scanning at the canal tip.

The PCA technique is a technique that can be used to simplify a dataset; more formally it is a linear transformation that chooses a new coordinate system for the data set such that the greatest variance by any projection of the data set comes to lie on the first axis (then called the first principal component), the second greatest variance on the second axis, and so on. PCA can be used for reducing dimensionality in a dataset while retaining those characteristics of the dataset that contribute most to its variance by eliminating the later principal components (by a more or less heuristic decision). PCA is also called the Karhunen-Loeve transform or the Hotelling transform. PCA has the distinction of being the optimal linear transformation for keeping the subspace that has largest variance. This advantage, however, comes at the price of greater computational requirement if compared, for example, to the discrete cosine transform. Unlike other linear transforms, the PCA does not have a fixed set of basis vectors. Its basis vectors depend on the data set.

The software tool 200 then optimizes the final cutting or reduction of the shell type using a look-up table 160 based on angular constraint parameters, which, e.g., are defined in a preferred embodiment as $62° \leqq \theta \leqq 82°$ for a fixed microphone type, and $43° \leqq \theta \leqq 83°$ for a floating microphone type. The software tool 200 may further provide metrological-based information for determining what type of wireless placement mechanism should be implemented.

Referring to FIGS. 2B, 5, 6 and 7A-C, the distinction between fixed and floating microphone are achieved as follows. The software tool 200: (1) detects the aperture 18 of the shell 10; (2) detects the directional vector 14 of the shell, which is a normalized vector from the center point of the second bend contour to the center of canal tip contour; (3) inserts a plane 20 at the aperture 18 and orients the normal **20*a* of the plane 20 in the same direction as the canal or bony part normal 14; and (4) computes the minor 18*b* and major 18*a* axis of the ellipse of the aperture 18 (the diameter of the ellipse minor axis 18*b* of FIG. 7B can be seen as the flattened surface in FIGS. 5 and 6 created by the minor axis plane). The minor 18*b* and major 18*a* axes are computed based on the geometric model, and the determination is made as follows: the software tool 200 compares the minor axis 18*a* length with the combined length of the diameter of the wireless coil 30 and the hybrid 32 used in the device (which are predefined and stored in the configuration table 160—the configuration table can be used to store information about the devices that are not specific to any one instance of a device). If the combined dimension is greater or equal to the minor axis 18*b* length, then the software tool 200 proposes a fixed microphone and the allowable angular ranges are predetermined as being $62° \leqq \theta \leqq 82°$. This range cannot be violated by the user and the restriction is imposed by look-up configuration. Similarly, if the combined dimension is less than or equal to the minor axis 18*b* length, then software tool 200 automatically proposes a floating microphone configuration and constrains the allowable angle range as being $43° \leqq \theta \leqq 83°$. The final angle θ for the cutting plane 20** is constrained within a configurable range. The rotation, as shown, is centered on the axis pointing into the page.

As noted above, the software tool 200 also automatically detects the canal tip 12 of the impression 10. The canal direction 14 is calculated from the tip plane and second plane; this calculation is required to ensure proper angular orientation of the impression 10. This is computed by generating a centerline 14 between the second bend 16 and the canal tip 12. As noted above, the software tool 200 computes the normal vectors of both the aperture 18 and second bend 16 planes, and automatically matches the normal vectors 16*a*, 20*a* of the second bend plane to the aperture plane (see FIG. 2B), which provides the mathematical basis of ensuring that the normal vectors 14 of the aperture 18 and second bend 16 planes are the same. The software tool 200 extracts the normal vector 16*a* of the second bend plane 16 and exports this and other vector values once the user accepts the detailed impression.

The software tool 200 automatically inserts the aperture plane 18, centerline 14, and second bend 16, and automatically orients the aperture plane (from the original aperture plane 18 to the final cutting plane 20) based on the normal vector 16*a* of the second bend 16. The user can adjust the cutting plane 20, if required, within the angular ranges for a floating or fixed microphone noted below if the model type is non-semi-modular, but the system will prevent the plane from being adjusted if the model type is semi-modular. The rotation angles are automatically disabled if user interaction results in a cutting plane 20 that is outside the given range. The reason for this distinction is that in the case of non-semi-modular, the hearing aid designer has some leverage in ensuring that the completed instrument is cosmetically appealing. This can be achieve if the technician is provided an allowable angular range within which the detected plane if required can be slightly nudged. In the case of a semi-modular faceplate, where in general in-software casing of the faceplate to the shell is accomplished, this degree of freedom is completely curtailed. The designer has only one way of ensuring that optimal wireless performance and ultimate casing of the shell are achieved. Hence, in the case of a semi-modular design, if the optimal configuration cannot be achieved, then a kick out criteria or alternative design route is advised.

Note that if the device type is semi-modular, then the optimal wireless angle cannot be adjusted by the user; otherwise, the user can orient the plane within the angular constraints prescribed in the lookup table—the software tool may allow the user to tilt the aperture plane at, in a preferred embodiment, ±10° along the x-axis for optimum angle placement (although this can be configurable).

The software tool 200 provides a configurable table 160 for both fixed microphone and floating microphone conditions, and has a defined range of three configurable angles for either floating or fixed coil configuration. The software tool 200 ensures that the resulting angle θ is bounded within the prescribed range as defined in the configuration table 160.

The software tool 200 also ensures that the distance between the canal tip 12 and final position of the aperture 18 is configurable (see FIG. 2B). If the distance is less than the configured value the aperture plane 20 is automatically offset by a secondary configured distance from its current position and orientation. The required canal length and offset values are configurable in the configuration table 160. If the canal length is less than the configurable value, the software tool 200 can also display an error message indicating that the canal length is below a configurable value and request that the canal be extended before proceeding.

The following parameters may be provided as configurable parameters in a preferences/configuration table 160: a) optimum angle ranges for fixed and floating microphones; b) the width of the hybrid; c) the diameter of the wireless coil; d) the canal length; and e) the offset distance from the aperture, although it is possible to store additional information in this table 160.

The automatic detection of the aperture 18, second bend 16, and canal tip 12 of the ear canal allow a cutting plane normal 20' to be matched to the second bend plane normal 16', thus defining the direction of the bony part of the ear and establishing parallelism between the these planes. This therefore provides the mathematical description of the required cutting plane 20 based on these angular determinations. This mathematical description can either be utilized for a precise manual cutting or it can be provided to an automated cutting system 170 (FIG. 1B) via an interface of the computer 120.

As noted above, the software tool 200 automatically detects the second bend 16 of the impression 10. The second bend 16 defined by the point cloud (in the undetailed impression) is critical to establishing the direction of the bony section of the impression 10. If the second bend plane 16 cannot be detected, as in the case of a straight canal, the software tool: a) approximates the second bend 16 using a plane offset at 5 mm from the canal tip 12 along the centerline 14, or b) uses the centerline 14 of the shell to determine the direction of the bony section.

The software tool 200 automatically detects the aperture 18 of the impression 10—an aperture 18 must be determined since all impressions have apertures, which are universal features of all ITE instruments.

Once all relative calculations have been made, the user indicates via the user interface 150 to accept the proposed detailing protocols for the device. If the shell size is below a prescribed length, a message is displayed indicating that shell cannot be built. Once the proposed detailing protocols for the device 10 have been accepted, the detailed impression data and normal vector of the second bend are written to the database 130, 140.

Figure 3B:
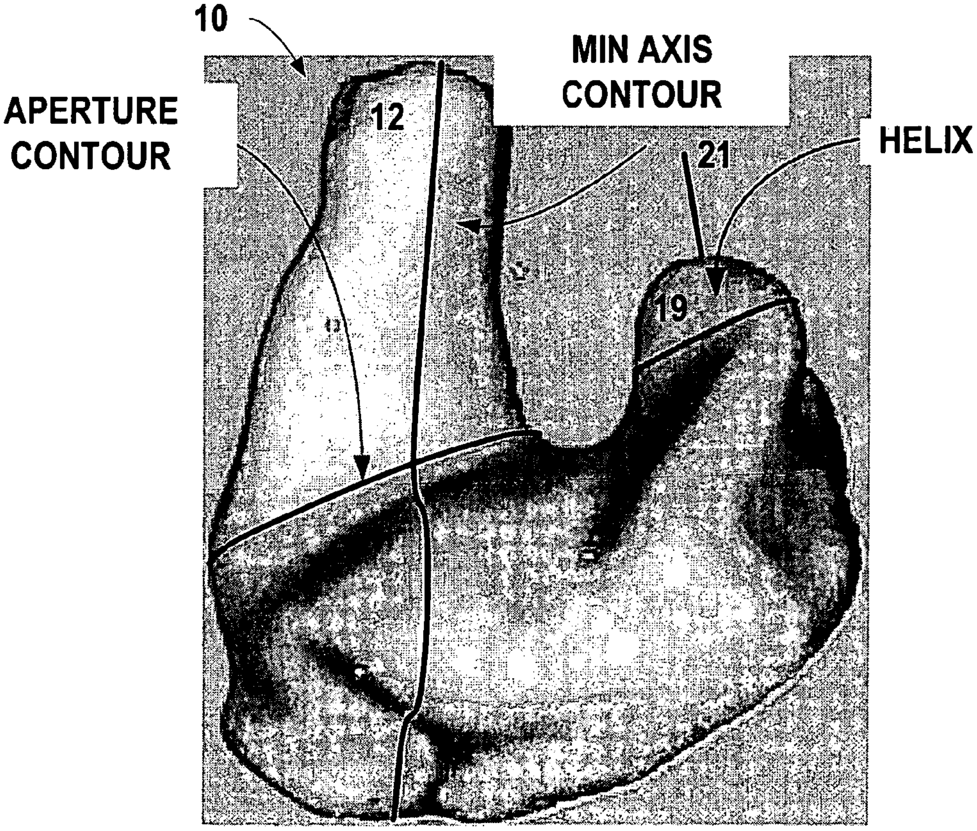
Figure 5:
FIG. 5 is a three-dimensional model illustrating the minor axis plane.
Figure 6:
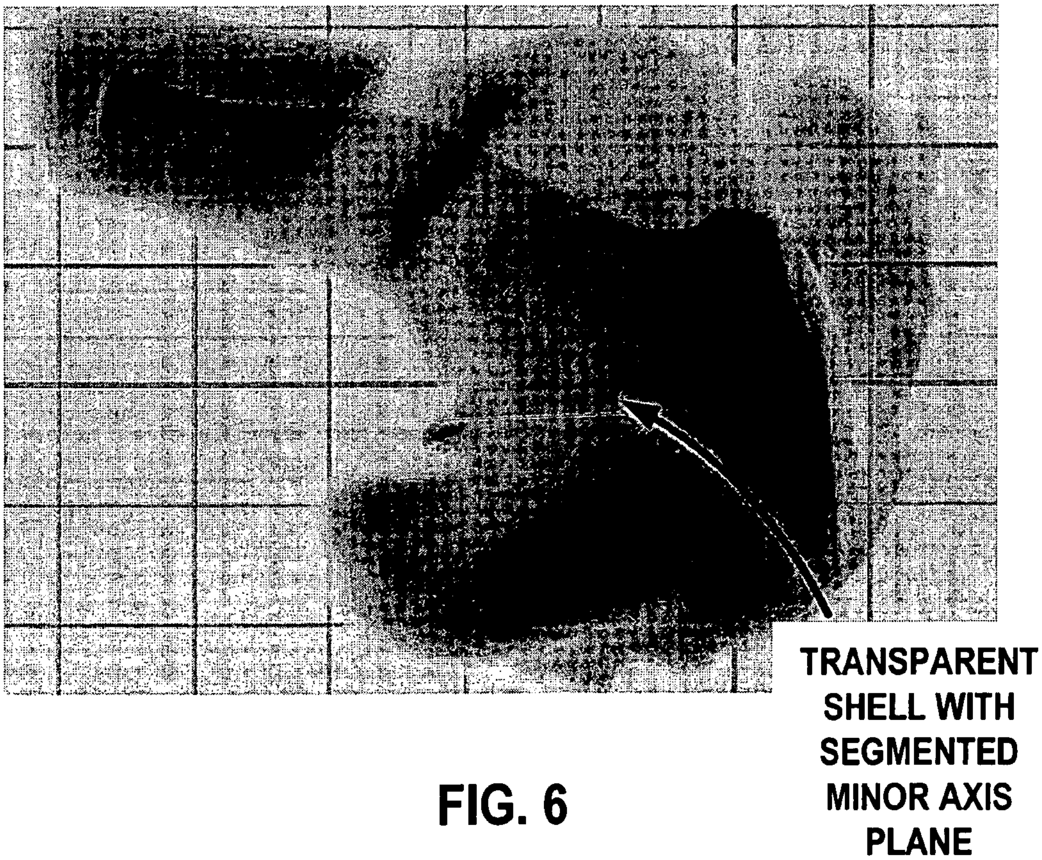
FIG. 6 is a three-dimensional model illustrating the segmented minor axis plane with transparent shell superimposed.
Figure 7B:
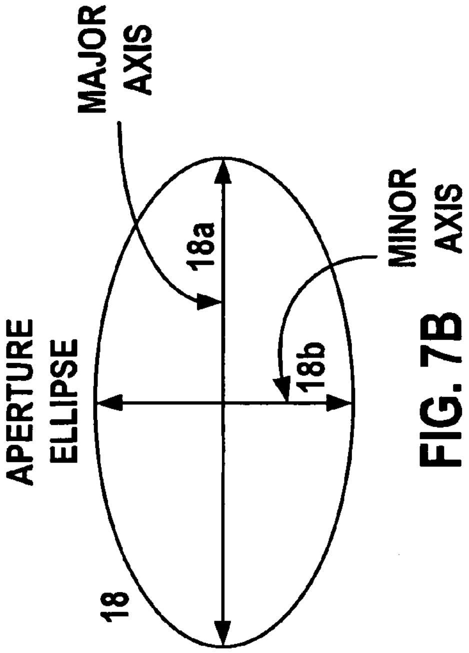
FIGS. 7A-C are pictorial schematics illustrating the aperture ellipse with coil and hybrid.
Figure 7C:
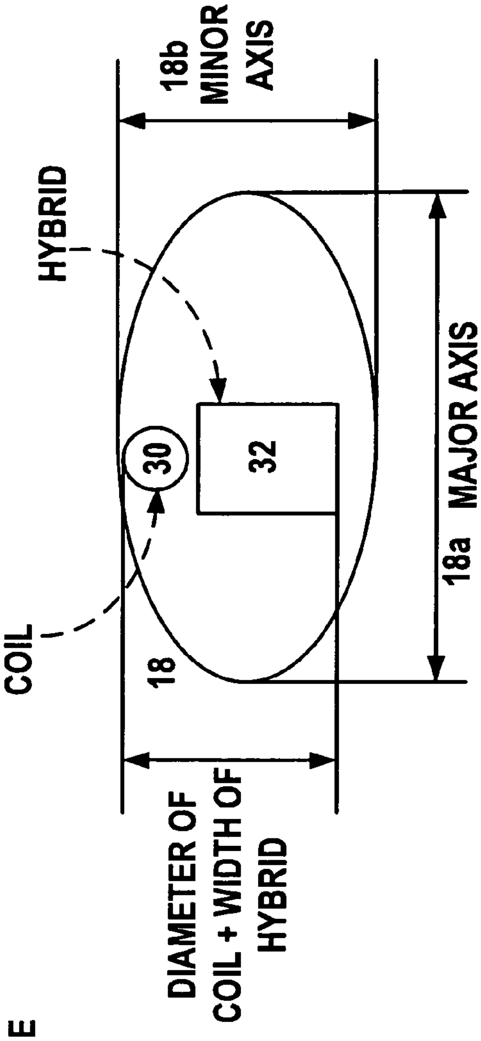
Figure 7A:
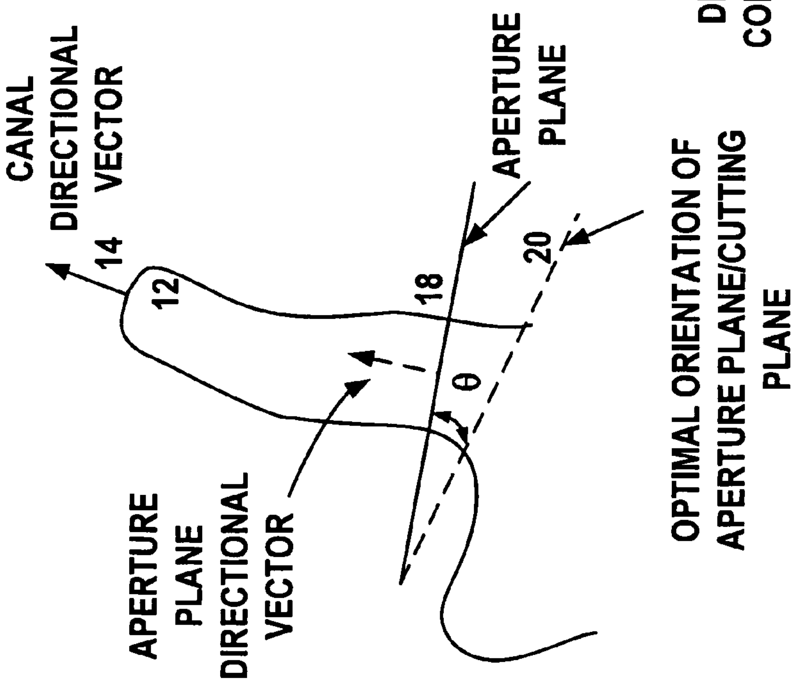

The software tool 200 computes and outputs an equation of the plane that runs through the canal along the minor axis and contains the bony part vector (see FIGS. 3B, 5 and 6). It also outputs, e.g., a Boolean flag, that determines which side of the minor axis plane the helix 19 is located on. It also outputs the bony part (canal directional) normal vector 14, the values of which are stored in the parameter table 130 associated with a specific instance of an impression 10.

The software tool therefore replaces the following previously performed manual functions: 1) it automatically detects the bony part or canal direction of the ear impressions; 2) it automatically detects the aperture of the canal with the corresponding cutting plane embedded (see FIG. 3A); 3) it automatically optimally positions the cutting plane at the aperture based on characteristic angular constraints in a customizable preferences table; and 4) it provides an optimal correspondence between binaural hearing instruments that is achieved by correcting inherent angular phase differences in the pair. This is accomplished by identifying the helix 19 location (FIG. 3B), which is defined by a 3D point vector 21 located at the tip of the helix region 19, and the minor axis plane on the impression. The correction angle is then applied using the optimal canal or bony part direction and the corresponding location of the helix. In general, the part direction between a pair of ears could be out-of-phase, but optimum wireless performance is only guaranteed when the canals are pointed directly at each other. The differences in canal direction is captured using the canal tip directional vector. These differences are then corrected using the helix 19 location as a reference point.

Additional features may include that the software tool 200 may export to other systems the normal vectors of the second bend plane when the completed impression is exported to the database as an attribute, and may also pass vector parameters to the external systems when an order is loaded for modeling. Additionally, it is possible, based on the presence of option codes, to enable whether the aperture plane can be movable or not.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Numerous modifications and adaptations will be readily apparent to those skilled in this art without departing from the spirit and scope of the present invention.

TABLE OF REFERENCE CHARACTERS

10 impression
12 canal tip
14 centerline
16 second bend
16' second bend of canal
**16*a*** normal vector to plane of second bend
18 aperture
18' aperture of ear canal
**18*a*** major axis of aperture ellipse
**18*b*** Minor axis of aperture ellipse
19 helix
20 cutting plane
**20*a*** normal vector to cutting plane
21 helix vector
30 coil
32 hybrid
50 cartilaginous sections of the ear
52 bony sections of the ear
54 ear canal
100 system for implementing the automated detailing
110 scanner/digitizer
120 computer
130 parameter table
140 impression data file
150 user interface
160 configuration table
200 software tool
250-290 method steps

What is claimed is:

1. A method for automating an electronic detailing of an impression for a hearing device, comprising:

forming an impression of an ear canal of a patient;

scanning and digitizing the impression producing a geometric model of the surface of the impression;

detecting, with a software tool, a bony part or canal direction with the impression model;

determining a second bend of the impression associated with a second bend of the ear canal and calculating a second bend plane and a vector normal thereto;

determining an aperture of the impression associated with an aperture of the ear canal;

determining a cutting plane through the aperture whose normal vector aligns with the normal vector of the second bend plane;

making the determined information associated with the second bend, the aperture, canal directional vectors and the cutting plane available in a parameter table as a digitized impression data output in a form suitable for operating an automated fabrication tool to fabricate a hearing aid shell based on the determined information.

2. The method according to claim 1, further comprising:

determining an aperture plane for the impression; and utilizing, through the software tool, a look-up table to select respectively different angular constraints θ between the cutting plane and the aperture plane dependent on whether a fixed microphone, or a floating microphone will be used in said hearing aid shell.

3. The method according to claim 1, comprising making said digitized impression data available as a point cloud.

4. The method according to claim 1, further comprising:

upon failure to determine an actual second bend of the impression, approximating a position of the second bend by calculating a configurable plane offset from a canal tip along a geometric centerline of the impression.

5. The method according to claim 1, further comprising:

enabling a user adjustment to the cutting plane if the device is a non-semi-modular device; and restricting a user adjustment to the cutting plane if the device is semi-modular.

6. The method according to claim 1, further comprising:

displaying a message to the user if a determined shell size is below a prescribed length.

7. The method according to claim 1, further comprising:

calculating a sum based on a diameter of a coil plus a width of a hybrid;

determining a minor axis diameter of the impression at the determined aperture;

producing an indication to use a fixed microphone if the calculated sum is greater than or equal to the minor axis diameter; and producing an indication to use a floating microphone if the calculated sum is less than the minor axis diameter.

8. The method according to claim 7, wherein determining the minor axis diameter comprises:

utilizing a principal component analysis tool to determine the minor axis.

9. The method according to claim 1, wherein determining the aperture of the impression comprises:

selecting a maximum change of perimeter of adjacent contours, which are generated by vertical scanning along a centerline of the impression.

10. The method according to claim 1, further comprising:

transmitting the stored determined information to an automated cutting machine; and executing the cutting with the automated cutting machine based on the transmitted data.

11. The method according to claim 1, further comprising:

determining that a distance between the canal tip and a final aperture position as so configured; and if the distance is less than approximately configured value, then offsetting the aperture plane by a secondary configured value from its current position and orientation.

12. The method according to claim 1, further comprising:

storing data in a configuration table selected from the group consisting of: a) optimum angle ranges for fixed and floating microphones; b) the width of the hybrid; c) the diameter of the wireless coil; d) the canal length; e) the offset distance from the aperture; f) the bony part directional vectors; and g) minor axis plane and relative helix location; and utilizing said configuration table, through said software tool, to generate said determined information.

13. The method according to claim 1, further comprising:

performing the steps for each of a first impression and a second impression, the first and second impressions forming a binaural hearing system; and correcting the cutting plane of the first impression based additionally on the stored determined information of the second impression; and correcting the cutting plane of the second impression based additionally on the stored determined information of the first impression.

14. The method according to claim 13, further comprising:

determining, for both the first impression and the second impression, helix tip location information; and utilizing the first and second helix tip location information in the correcting of the respective cutting planes.

15. A system for automatic detailing of an impression for a hearing device, comprising:

a scanner that acquires three-dimensional data defining an impression of an ear canal of a patient, said three-dimensional data representing a geometric model of the surface of the impression; and a processor in communication with said scanner, said processor being supplied with said three-dimensional data and being configured to detect, using a software tool, a bony part or canal direction using the geometric model, and to determine a second bend of the impression associated with a second bend of the ear canal and to calculate a second bend plane and a vector normal thereto, and to determine an aperture of the impression associated with an aperture of the ear canal, and to determine a cutting plane through the aperture having a normal vector that is aligned with the normal vector of the second bend plane, and to make the determined information associated with the second bend, the aperture, the canal directional vectors, and the cutting plane available in a parameter table as a digitized impression data output in a form suitable for operating an automated fabrication tool to fabricate a hearing aid shell based on the determined information.

16. A system as claimed in claim 15 comprising an automated fabrication tool in communication with said processor that receives said digital impression data output therefrom and that is configured to fabricate said hearing aid shell based on the determined information.

17. A computer-readable medium encoded with programming instructions, said computer-readable medium being loadable into a processor having access to three-dimensional data representing a geometric model of a surface of an impression of an ear canal of a patient, and said programming instructions causing said processor to:

detect, using a software tool, a bony part or canal direction with the geometric model;

determine a second bend of the impression associated with a second bend of the ear canal and calculate a second bend plane and a vector normal thereto;

determine an aperture of the impression associated with an aperture of the ear canal;

determine a cutting plane through the aperture having a normal vector aligned with the normal vector of the second bend plane; and make the determined information associated with the second bend, the aperture, the canal directional vectors and the cutting plane available in a parameter table as a digitized impression data output in a form suitable for operating an automated fabrication tool to fabricate a hearing aid shell based on the determined information.

* * * * *